United States Patent
Fields

[11] 3,880,452
[45] Apr. 29, 1975

[54] CONNECTORS
[76] Inventor: Robert E. Fields, 2 Regent St., Cambridge CB2 1DB, England
[22] Filed: Apr. 19, 1973
[21] Appl. No.: 352,796

[30] Foreign Application Priority Data
Apr. 27, 1972 United Kingdom............... 19608/72

[52] U.S. Cl................. 285/177; 285/341; 285/351; 285/369; 285/423
[51] Int. Cl.............................................. F16l 47/00
[58] Field of Search........ 285/177, 234, 334.3, 346, 285/351, 352, 332.3, 334.5, 369, 423

[56] References Cited
UNITED STATES PATENTS

| 1,930,833 | 10/1933 | Barrett | 285/334.3 X |
|---|---|---|---|
| 2,422,158 | 6/1947 | Wolfram | 285/351 X |
| 2,466,294 | 4/1949 | Allen | 285/341 X |
| 2,688,651 | 9/1954 | Blake | 285/341 X |
| 2,724,602 | 11/1955 | Carey et al. | 285/352 X |
| 3,381,978 | 5/1968 | Faustini | 285/334.4 X |

FOREIGN PATENTS OR APPLICATIONS

| 472,773 | 9/1937 | United Kingdom | 285/234 |
|---|---|---|---|
| 807,801 | 1/1959 | United Kingdom | 285/369 |

*Primary Examiner*—Werner H. Schroeder
*Assistant Examiner*—Moshe I. Cohen
*Attorney, Agent, or Firm*—Allison C. Collard

[57] ABSTRACT

A connector which can be used to interconnect tubes of different diameters, for example, for use with laboratory equipment. The connector comprises an inner tubular member with a central through passage and a concave frusto-conical orifice at one or both ends. One or more ring seals surround the tube in the orifice. A cup-shaped outer cap has a central aperture to accommodate the tube and a side wall which surrounds the ring seal(s) and the inner tubular member. The cup-shaped member is retained on the inner tubular member, for example, by cooperating respective female and male threads formed on such members.

5 Claims, 8 Drawing Figures

CONNECTORS

The invention relates to connectors and more particularly to connectors capable of being connected in fluid-tight manner to a range of tube or conduit diameters.

According to the invention there is provided a connector comprising an inner tubular member having a central through passage with a concave frusto-conical orifice at least at one end thereof to accommodate the end of a tube or conduit, at least one ring seal arranged to surround the tube or conduit, in use, in the vicinity of the orifice, a generally cup-shaped outer cap which is formed with a central aperture to accommodate the tube or conduit, in use, and has a side wall which surrounds the ring seal(s) and the inner tubular member, and means for retaining the cup-shaped member in position on the tubular member.

The means for retaining the cup-shaped member on the inner tubular member may comprise a male screw thread formed on the outer surface of the inner tubular member and a cooperating female screw thread formed on the inner surface of the cup-shaped member.

The inner tubular member may be formed with similar orifices at both ends, each accommodating at least one ring seal and each having cooperating cup-shaped members.

The or each at least one ring seal may comprise a cylindrical member of resilient material having a through aperture or may comprise a plurality of O-ring seals of resilient material.

The or each at least one ring seal may comprise a seal of resilient material having a through aperture and having outer surfaces which comprise two frusto-cones located back to back. The connector may comprise two inner tubular members with a common member therebetween which houses both the ring seals.

The inner end of the tubular member or conduit may be flared after being passed through the at least one ring seal.

Both the tubular and cup-shaped members may be formed of polytetrafluoroethylene.

The foregoing and further features of the invention may be more readily understood from the following description of some preferred embodiments thereof with reference to the accompanying drawing, in which.

Figure 1:
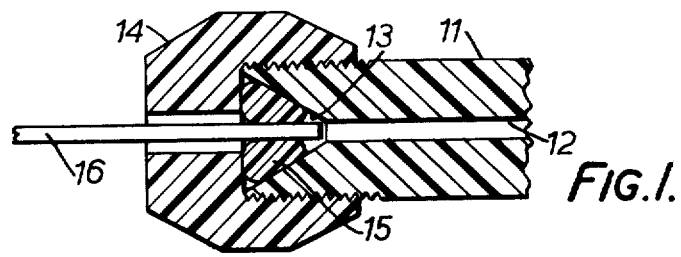
FIG. 1 is a side sectional view of a connector.

Referring firstly to FIG. 1 there is shown a connector which comprises a tubular member 11 formed with a central through passage 12 and a concave frusto-conical orifice 13 at one end. A generally cup-shaped member or cap 14 has an internal screw thread with engages a screw thread formed on the outer surface of member 11 at the end formed with orifice 13. An O-ring seal 15 is held within orifice 13 by the cap 14.

To fix the connector to a tube 16 the cap 14 is rotated to move it in a direction away from member 11 but the cap 14 need not be completely removed from member 11. The end of tube 16 is then inserted into a central aperture in cap 14 to lie in orifice 13 within the O-ring seal 15. The cap 14 is then screwed on to member 11 to cause the O-ring seal 15 to be compressed not only axially (with respect to member 11) but also radially due to the surface of frusto-conical orifice 13.

The same connector could be used to clamp a larger diameter tube to provide a fluid-tight seal between it and the central passage 12 of member 11.

Figure 2A:
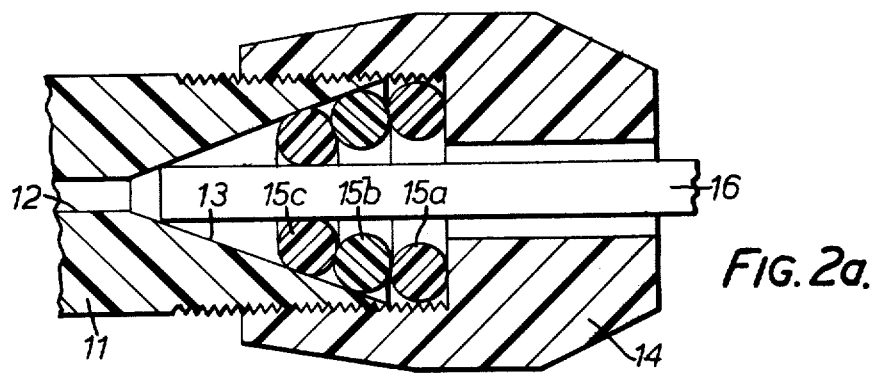
FIGS. 2a, 2b and 2c are side sectional views of an alternative connector shown in different positions for connecting to different diameter tubes.
Figure 2B:
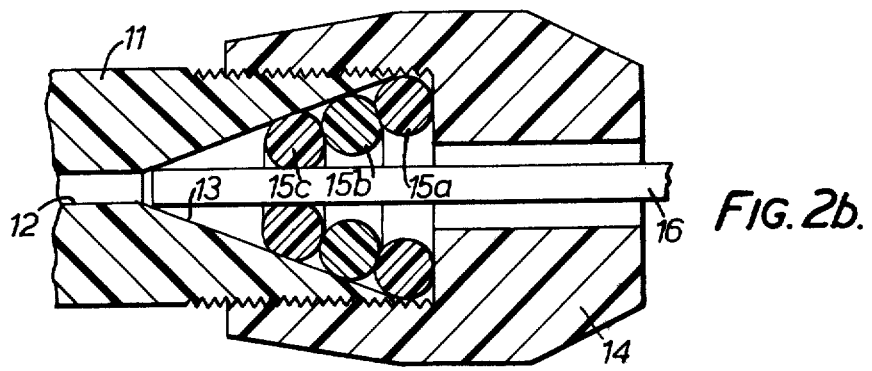
Figure 2C:
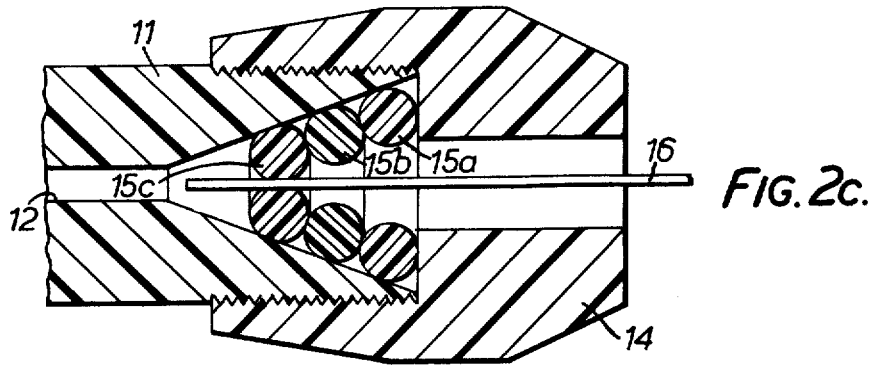

Referring now to FIGS. 2a, 2b and 2c a similar connector is shown except that three O-ring seals 15a, 15b and 15c are utilised instead of a single seal 15. This arrangement gives a wider range of tube diameters which can effectively be connected.

FIG. 2a shows the connector in position with a relatively large diameter tube 16 connected thereto. FIG. 2b shows the connector in position with an intermediate diameter tube 16 connected thereto. FIG. 2c shows a similar view with a relatively small diameter tube connected.

Figure 3:
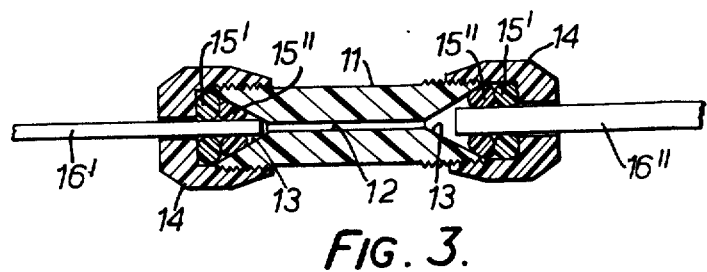
FIG. 3 is a side sectional view of a further alternative connector inter-connecting two different diameter tubes.

Referring now to FIG. 3 there is shown a similar connector with two O-ring seals 15' and 15'' and with a cap 14 provided at each end of member 11. This embodiment illustrates how the connector can be used to interconnect a relatively small diameter tube 16' to a larger diameter tube 16''.

The connector can be used to interconnect tubes as shown in FIG. 3 and in addition can form a fitting on an apparatus to allow connection of different diameter tubes to such apparatus.

The members 11 and 14 may be made of polytetrafluoroethylene or any other suitable synthetic plastics material.

Figure 4:
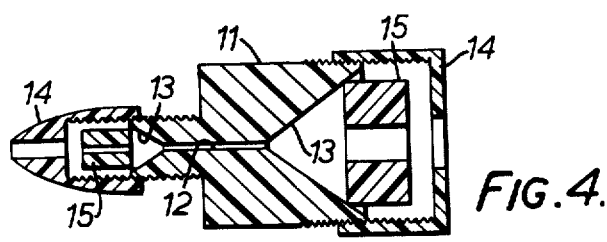
FIG. 4 is a side sectional view of a further alternative connector for inter-connecting two different diameter tubes.

Referring now to FIG. 4 there is shown a connector similar to that of FIG. 3 except that the arrangement at the left is for connecting a range of small diameter tubes and the arrangement at the right is for connecting larger diameter tubes. In this embodiment the ring seals 15 are in the form of cylinders of resilient material such as silicone or fluorocarbon rubber, but the action of the connector is the same as described for the above embodiments.

Figure 5:
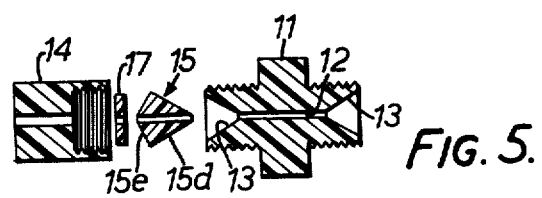
FIG. 5 is an exploded side sectional view of a part of a further connector for inter-connecting two tubes.

Referring now to FIG. 5 there is shown a further similar connector to that of FIG. 3 except that the ring seal 15 has outer surfaces 15d and 15e which comprise two frusto-cones back to back. In this embodiment the seal 15 may be backed with a washer 17 of stainless steel or polytetrafluoroethylene. For connecting a plastics tube to this connector the free end of the tube is heated and pulled out. After cooling the tube is cut at the narrow portion and threaded through cap 14, washer 17 and seal 15. The seal 15 is pulled past the narrow portion and on to the tube where it is held tightly. The excess tube is trimmed at seal 15 and the connector assembled together as described above.

Figure 6:
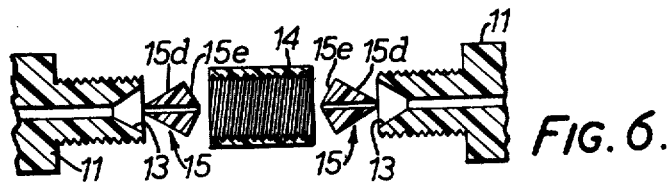
FIG. 6 is an exploded side sectional view of an arrangement for connecting a device to a connector, or two connectors that are embodied on a device.

Referring now to FIG. 6 there is shown a connector for connecting two connectors directly or for connecting a connector to a piece of apparatus. In this arrangement a common member 14 spans two tubular members 11 with the seals 15 housed in common member 14. The surfaces 15e of the two seals 15 which abut one another permit the seals to seat first around the central aperture. The area of seating increases, travelling outwardly as the connector is assembled. Should the fitting become loose the fluid seal will be maintained since the inner elastic portion is under maximum pressure.

I claim:

1. A connector for receiving and sealing the end of a hollow tube and used to interconnect tubes of different diameter comprising:

a flexible inner tubular member having a central through passage having a diameter approximately equal to that of the smallest tube to be accommodated with a concave frustro-conical orifice at one end thereof opening from the central through passage to a diameter approximately equal to the largest tube to be accommodated to receive the end of the tube;

at least one cylindrical, resilient ring seal surrounding the tube and disposed within a portion of the frusto-conical orifice;

a substantially cup-shaped, flexible outer cap having a central aperture of a diameter approximately that of the largest tube to be accommodated to receive the tube, and a side wall for surrounding the inner tubular member;

a male screw thread formed on the outer surface of the inner tubular member; and a cooperating female screw thread formed on the inner surface of the cup-shaped member for retaining said cup-shaped member in position on said tubular member so that said at least one ring seal will be compressed both axially with respect to said tubular member, and radially due to the surface defined by the fustro-conical orifice.

2. A connector as claimed in claim 1 wherein the inner tubular member is formed with similar orifices at both ends, each accommodating at least one ring seal and each having cooperating cup-shaped members.

3. A connector as claimed in claim 1, wherein each said at least one ring seal comprises a plurality of O-ring seals of resilient material.

4. A connector as claimed in claim 1 wherein each inner tubular member and cup-shaped member are formed of polytetrafluoroethylene.

5. The connector as recited in claim 1 comprising an additional cup-shaped outer cap having a central aperture, and wherein the opposite end of said inner tubular member includes a concave frusto-conical orifice joined to said additional outer cap, and further ring seals disposed in the orifice between the additional cap and the opposite end of said tubular member.

* * * * *